United States Patent
Whitehead et al.

(10) Patent No.: US 12,108,235 B2
(45) Date of Patent: Oct. 1, 2024

(54) VIRTUAL REALITY HEADSET AUDIO SYNCHRONIZATION SYSTEM

(71) Applicant: Surround Sync Pty Ltd, Wembley (AU)

(72) Inventors: Briege Whitehead, Wembley (AU); Benn Ellard, Wembley (AU); Thomas Morell, Wembley (AU); David Raines, Wembley (AU)

(73) Assignee: Surround Sync Pty Ltd (AU)

( * ) Notice: Subject to any disclaimer, the term of this patent is extended or adjusted under 35 U.S.C. 154(b) by 152 days.

(21) Appl. No.: 18/056,469

(22) Filed: Nov. 17, 2022

(65) Prior Publication Data

US 2023/0156421 A1     May 18, 2023

(30) Foreign Application Priority Data

Nov. 18, 2021    (AU) .............................. 2021903720

(51) Int. Cl.
*H04S 3/00*         (2006.01)
*H04L 67/131*    (2022.01)

(52) U.S. Cl.
CPC ............ *H04S 3/004* (2013.01); *H04L 67/131* (2022.05)

(58) Field of Classification Search
CPC .......... H04S 3/004; H04S 3/008; H04S 7/304; H04S 7/306; H04L 67/131;

(Continued)

(56) References Cited

U.S. PATENT DOCUMENTS 8,706,279 B2 *   4/2014   Cho ........................ G06F 17/00
                                                      455/3.06
8,751,705 B2 *   6/2014   Minemura ........... H04N 21/439
                                                         710/61

(Continued)

FOREIGN PATENT DOCUMENTS

CN        1071698518 A     9/2017
CN        110691231 A      1/2020

(Continued)

*Primary Examiner* — Xu Mei
(74) *Attorney, Agent, or Firm* — Cook Alex Ltd.

(57) ABSTRACT

A system 3 synchronises a plurality of virtual reality headsets 2 to corresponding multichannel audio. System 3 has a plurality of independently operable virtual reality headsets each having one or more images preloaded thereon and a distribution device 4 in the form of a server is in Wi-Fi communication via a wireless access point 5 with each virtual reality headset where the server 4 triggers the one or more preloaded images on each headset. A sound rack device 6 is in Wi-Fi communication with server 4 and configured to send time codes signals thereto. A sound mixer 7 is in cable communication with the sound rack device 6 and receives audio file data corresponding to virtual reality image content therefrom simultaneously with the server 4. The server 4 is cable connected to the wireless access point 5 and configured to simultaneously message each headset 2. At least one speaker element is provided for each channel of audio being connected to the mixer 7 such that upon receipt of the audio file, the mixer 7 is configured to relay each channel audio signal to respective speakers 8 in synchronisation with the VR headset images.

8 Claims, 2 Drawing Sheets

(58) Field of Classification Search
CPC . H04N 21/43076; G06F 3/011; G11B 27/323; H04H 20/18; H04H 20/28; H04H 20/33; H04R 3/12; H04R 5/04; H04R 27/00; H04R 2205/024
USPC .......................... 381/74, 26, 384; 455/575.2
See application file for complete search history.

(56) References Cited

U.S. PATENT DOCUMENTS

| | | | | |
|---|---|---|---|---|
| 9,338,391 | B1* | 5/2016 | Greene | H04N 21/41265 |
| 10,805,063 | B2* | 10/2020 | Mizuno | H04N 21/21805 |
| 10,834,296 | B2* | 11/2020 | Maker, III | H04N 21/43076 |
| 11,856,275 | B1* | 12/2023 | Mohr | H04N 21/4307 |
| 2006/0126854 | A1* | 6/2006 | Noto | H04R 5/04 |
| | | | | 381/19 |
| 2006/0245599 | A1 | 11/2006 | Regnier | |
| 2014/0297815 | A1* | 10/2014 | Rajapakse | H04L 65/80 |
| | | | | 709/219 |
| 2016/0134833 | A1 | 5/2016 | Greene et al. | |
| 2017/0109131 | A1 | 4/2017 | Boesen | |
| 2018/0014140 | A1 | 1/2018 | Milevski et al. | |
| 2019/0105568 | A1 | 4/2019 | Platt et al. | |
| 2020/0007306 | A1 | 1/2020 | Mizuno et al. | |
| 2020/0098187 | A1* | 3/2020 | Herscher | A63F 13/30 |
| 2021/0255174 | A1 | 11/2021 | Reilly | |

FOREIGN PATENT DOCUMENTS

| | | |
|---|---|---|
| DE | 202020107528 U1 | 2/2021 |
| FR | 2698196 A1 | 12/1993 |
| KR | 20160136160 A | 11/2016 |
| WO | 9726715 A1 | 7/1997 |
| WO | 2018026963 A1 | 2/2018 |
| WO | 2019010251 A1 | 1/2019 |

* cited by examiner

VIRTUAL REALITY HEADSET AUDIO SYNCHRONIZATION SYSTEM

RELATED APPLICATIONS

This application claims priority to Australian Patent Application No. 2021903720, filed Nov. 18, 2021, which is hereby incorporated herein by reference.

DESCRIPTION

Technical Field

The invention relates to virtual reality (VR) systems and, in particular, to a system and method of synchronising sound delivery to a large number of VR headsets over a Wi-Fi network.

The invention has been developed primarily to provide a system and method of synchronising surround sound audio at 5.1 and 7.1 channels or greater over a Wi-Fi network having greater than 200 individual connected VR headsets and will be described hereinafter with reference to this application. However, it will be appreciated that the invention is not limited to this particular implementation.

BACKGROUND

VR systems provide a head mounted display as means of creating a 3D virtual environment for a user. The user is immersed in that virtual environment and to allow a natural interaction with the virtual scene, and move about it in the scene. Commonly, this is achieved using a headset that is opaque to outside light providing visual and audible isolation.

The VR headsets can be preloaded with a virtual environment or could receive that by cable or wireless connection to a remote computing device. The VR headsets include orientation sensors so that movement thereof provides corresponding change in perspective shown to the user. Particularly in early VR systems, a latency or time lag occurred between a user changing direction and the image of that perspective. This disorientation of perception was often the cause of a feeling of sickness in a user.

More recent VR headset systems have addressed this with the VR environment being locally loaded and processed, or by the use of computational techniques including AI to predict required side images for when the VR headset changes orientation. However, it has been found unacceptable latency is encountered in a film (or other media) itself, triggering simultaneously with every other VR headset when a significant number of headsets are used. That is, whilst it is desirable for the audio for each headset to commence at the exact same time this does not occur with commercially available audio synchronisation systems, especially when using 7.1 and higher audio channels. It will be appreciated that when many VR headsets are simultaneously used in a system, significant resources are required to avoid latency issues.

In the case of VR films where hundreds of users may be simultaneously watching the same movie using a Wi-Fi network, VR headsets require synchronisation of movie scenes and audio signals with the headsets. There are various known means of performing this function including commercially available systems and general configurations can be seen by way of example at https://creator.oculus.com/learn/spatial-audio/.

Commercially available systems capable of synchronisation of VR headsets with a 7.1 audio system which provides improved sound directionality for the user over 5.1 channel audio and even more so over simple stereo audio have been found to operate with undesirable stability issues and most importantly with an undesirable latency with 7.1 or higher channel audio. Some commercial systems were, however, found to operate satisfactorily with 5.1 channel surround sound. Coupled with image latency, the use of VR technology simultaneously in large number such as in a cinema or theatre has not been readily embraced.

Object

The object of the invention is a desire to provide a system of mass synchronising VR headsets with 7.1 or greater channel audio that overcomes or substantially ameliorates one or more of the disadvantages of the prior art, or to provide a useful alternative.

SUMMARY

According to an aspect of the invention there is provided a system for synchronising a plurality of virtual reality headsets to corresponding multichannel audio, the system comprising:

a plurality of independently operable virtual reality headsets each having one or more images preloaded thereon;

a distribution device in Wi-Fi communication via a wireless access point with each virtual reality headset, the distribution device configured to trigger the one or more preloaded images on each headset;

a sound rack device in Wi-Fi communication with the distribution device and configured to send time codes signals there to;

a sound mixer in cable communication with the sound rack device and configured to receive audio file data corresponding to virtual reality image content therefrom simultaneously with the distribution device;

the distribution device being cable connected to the wireless access point and configured to simultaneously message each headset; and at least one speaker element for each channel of audio, each speaker element being connected to the mixer wherein upon receipt of the audio file, the mixer is configured to relay each channel audio signal to respective speakers in synchronisation with the VR headset images.

It has been found that the invention advantageously provides a system of synchronising of a very large number of VR headsets with 7.1 or greater channel audio stably and reliably. Further, lower latency is achieved in synchronising the multichannel signal with the images displayed on the VR headsets.

BRIEF DESCRIPTION OF DRAWINGS

Preferred embodiments of the invention will now be described, by way of example only, with reference to the accompanying drawings in which.

DESCRIPTION OF EMBODIMENTS

Figure 1:
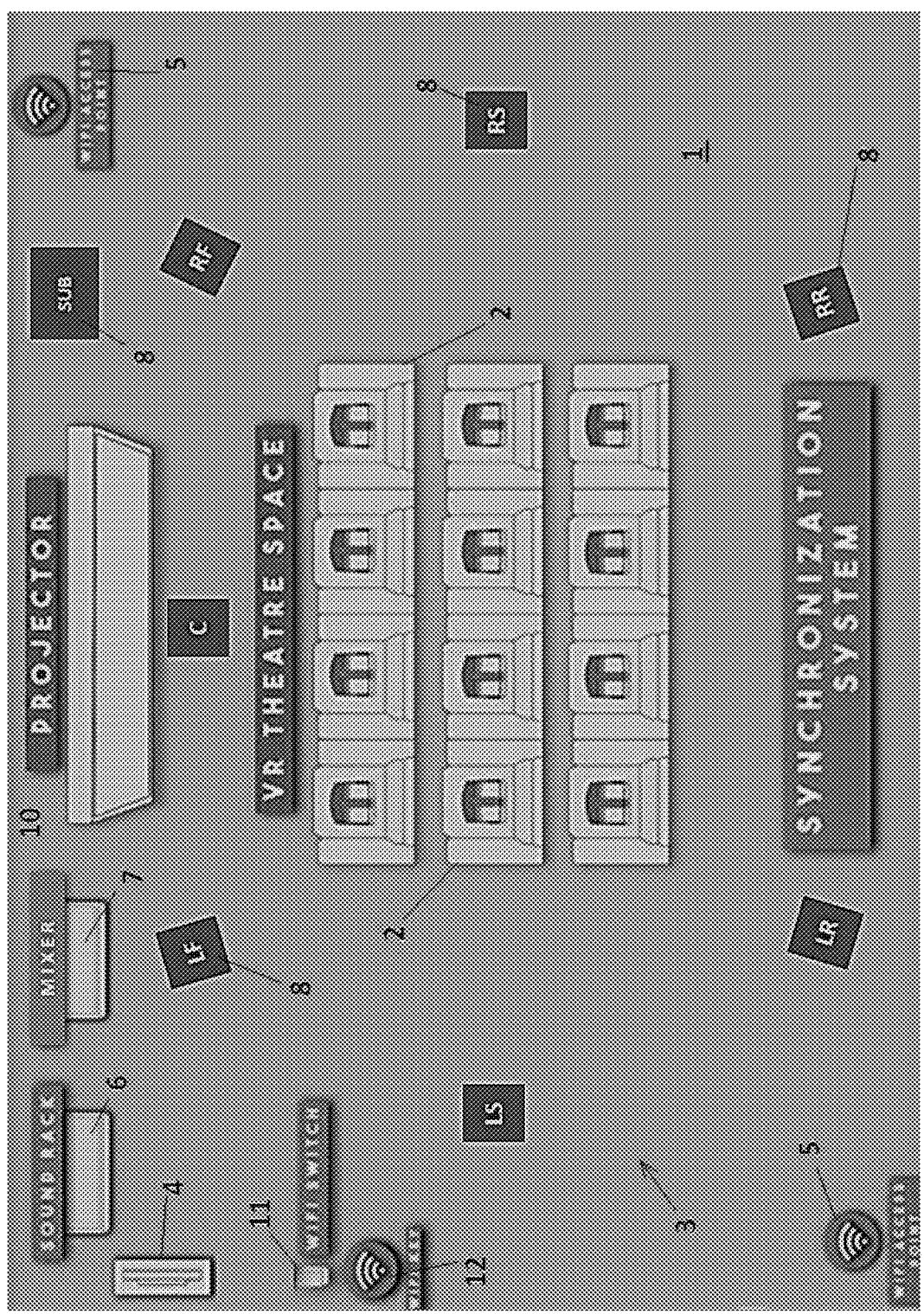
FIG. 1 is a schematic diagram of a VR system having 7.1 channel audio synchronisation system according to a preferred embodiment.

In respect of the preferred embodiments described hereinafter, it will be understood that like reference numerals have been used to describe like components unless expressly denoted otherwise.

Referring to FIG. 1, there is shown a schematic representation of a virtual reality cinema in a venue 1 of the preferred embodiment. The cinema 1 is an enclosed room having an array of seats 2 each configured for receiving a user or viewer (not illustrated). Each viewer has a virtual reality headset (not shown but is illustratively equivalent to each seat 2) that is independently operable and has a movie preloaded in a memory thereof. In the preferred embodiment of a movie theatre or cinema 1 for example, there are 100 or more viewers each with a VR headset. It will be appreciated that significantly more simultaneous viewers each with a VR headset can be provided allowing, for example, a larger commercial scale by number of viewers in the cinema 1.

The cinema 1 is configured to further include a system 3 for synchronising the movie displayed on the plurality of virtual reality headsets to corresponding multichannel audio, in the form of 7.1 channel audio in the preferred embodiment. The system 3 has a distribution device 4 in the form of a computer server in a Wi-Fi communication network having a wireless access point 5, the Wi-Fi preferably being a convention IEEE 801.11 protocol. Access point 5 is connected to distribution device 4 by ethernet cable in the preferred embodiment and this allows distribution device 4 to communicate with each virtual reality headset. The distribution device 4 activates or triggers the preloaded movie images simultaneously on each headset.

The system 3 further includes a sound rack device 6 that is cable connected to the server 4 via an audio cable connection. The sound rack device 6 sends time code signals to the server 4 and sends the eight channels of (balanced) audio to an audio or sound mixer 7. The timecode signals include data indicative of desired timing of audio channel signals with the VR movie images.

Sound mixer 7 is connected to the sound rack device 6 via an audio cable connection. The mixer 7 receives audio file data corresponding to virtual reality movie image content from the sound rack device 6 at substantially the same time or simultaneously with the server 4 receiving the timecode data. So far as the server 4 is cable connected to the wireless access point 5 it allows each headset to be messaged substantially simultaneously where the access points 5 and each VR headset are in Wi-Fi communication. The audio file that was received by the mixer 7 is then sent to respective speakers 8 as parts of a PA system.

In the preferred embodiment, a single speaker 8 is provided for each of the 7.1 channels of audio. Once the mixer 7 is in receipt of the audio file delivered in correspondence with the timing code data sent simultaneously to server 4 which sends timecode (byte packet) data, the mixer 7 is configured to relay each channel audio signal to respective speakers 8 in synchronisation with the VR headset images.

As can be seen, timecode data is sent from the sound rack device 6 to the server 4 which upon receipt the signal causes a Wi-Fi 33 signal to trigger all VR headsets to begin playback of the film or images. Simultaneously, sound rack device 6 also triggers the 7.1 audio channels to the PA sound system. This allows a true 360 degree, fully immersive and shared audio experience that allows audiences to engage with the medium of virtual reality while interacting with other participants as the system has insignificant latency even though there may be 200+ headsets operating simultaneously. That is, sound rack device 6 independently signaling audio channels removes latency that is present when server 4 is used to signal mixer 7.

In the preferred embodiment, system 3 further includes a two-dimensional display 10 in the form of a light projector system or OLED display, for example. The display 10 is cable connected to the server 4 and is configured to simultaneously display content corresponding to one or more images displayed on one or each headset on the display 10.

System 3 is preferably further configured to allow each headset to communicate data associated with the server 4. Such data includes headset operability, health or indication of malfunction, as well as battery life and other performance characteristics. Importantly, there is no timecode being sent from the sound rack device 6 to the VR headsets as the timecode goes to the server 4 and the PA sound system.

Advantageously, it can be seen the system 3 addresses the technical limitation of a low latency networking system where all headsets are synchronized and configured to operate simultaneously along with the redundancies. This significantly improves user experience which is desirable commercially.

Figure 2:
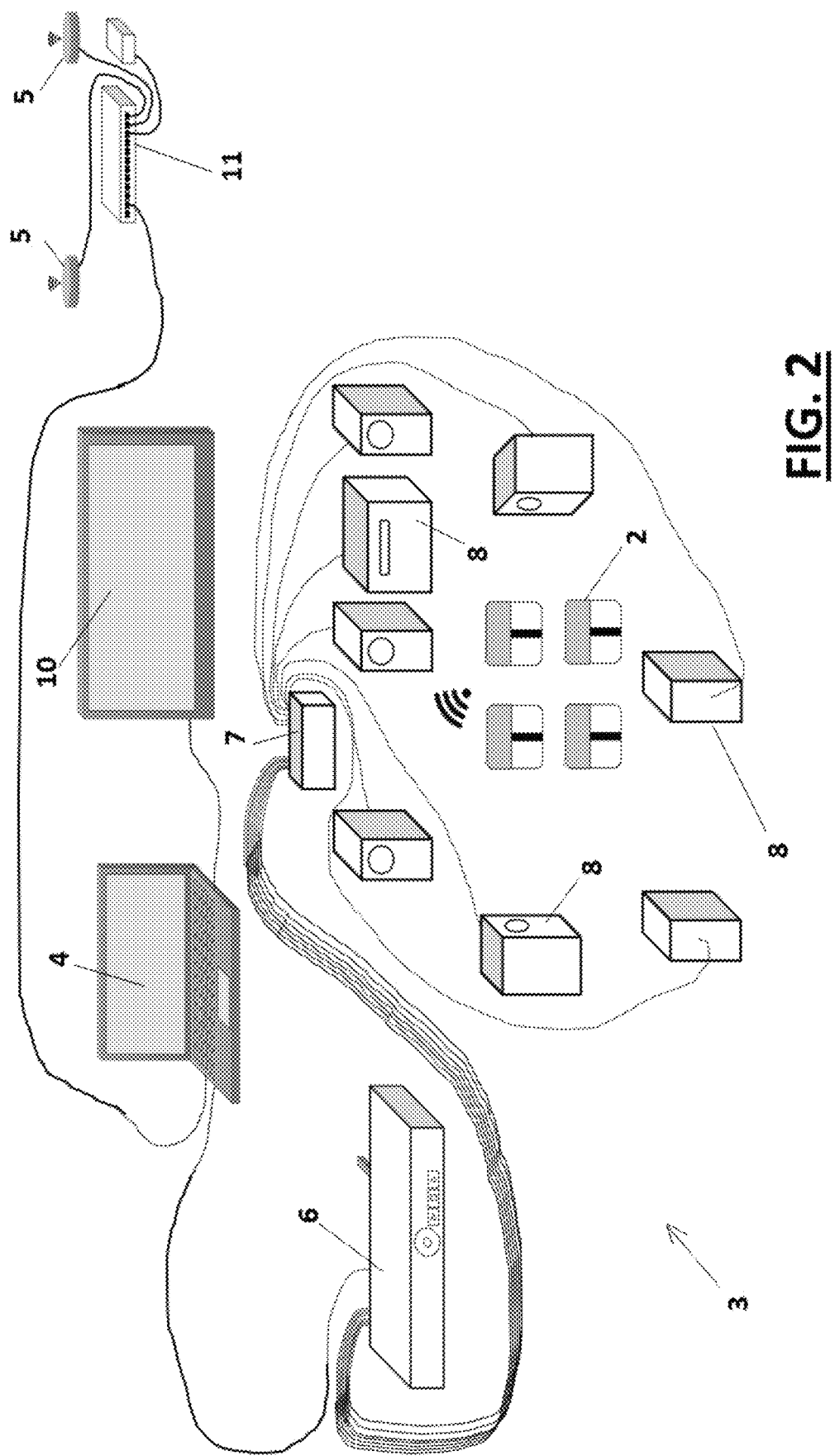
FIG. 2 is schematic representation of VR system having 7.1 channel audio according to another preferred embodiment.

Referring now to FIG. 2, there is shown a representation of a VR system 3 having 7.1 channel audio according to another preferred embodiment and where that system 3 includes at least one or two hundred connected VR headsets (also represented per seat or chair 2) and at least one non-headset display 10. System 3 can be simplified into two simultaneously operable aspects of the audio system and the visual system. Both are configured to operate from a single trigger point to reliably deliver stable synchronisation between the audio and visual systems.

System 3 audio signals originate from the sound rack device 6 which is configured to include at least sixteen output audio channels. In the preferred embodiment, device 6 is configured to output twenty-four audio channels.

In this preferred embodiment, a USB2 or USB3 portable memory media device containing the source files for eight audio channels is connected to device 6. Each of the audio channels are for simultaneous broadcast of audio corresponding to visual media content that is being displayed through the visual system and shown on each VR headset. When device 6 is executed, it sends eight audio files through the corresponding channel to the audio mixer 7 which also acts as a routing device. The audio signals can be paused or stopped from device 6 either by means or one or more actuators (e.g. buttons) or remotely.

The device 6 of FIG. 2 includes an audio play back wheel or other means including to remotely allow an operator of system 3 to rewind or fast forward through the audio files for broadcast. This allows, for example, the operator to skip to a specific time point in film images displayed on the VR headsets. It will be appreciated that sound rack device 6 of this preferred embodiment includes a cable output for each of the eight audio channel signals and this is shown schematically where the cables terminate at sound mixer 7.

As shown, each of the eight audio channel signal are sent from the mixer 7 to a respective speaker 8. It will be appreciated that the sound mixer 7 can also preferably be used to adjust the calibration of the speakers 8 within the venue 1. In the 7.1 channel audio system, the eight speakers 8 are disposed in any desired or conventional locations namely, front left & right main speakers, centre channel speaker, side surround speakers and rear surround speakers. It will be appreciated this is correspondingly useful for 5.1, 9.1, 11.1 and larger PA audio channel systems, or for systems such as Dolby™ systems including ATMOS, DST:X & Auro-3D.

Turning to the visual system aspect, this also commences with sound rack device 6. The USB portable media device also provides a source file containing a timecode that corresponds to the media content that is being displayed through the headsets. Such timecodes are preferably industry standard timecodes for example those attached to a film when the venue 1 is the cinema.

The controls for the audio can also be used to control the visual functions. For example, when actuated the device 6 sends the timecode through one channel of the sixteen channels on device of FIG. 2. The device 6 allows the timecode broadcast to be stopped, skipped or paused and is connected to distribution device 4 by means of a single audio cable.

The distribution device 4 is configured to receive the time code from sound rack device 6 and distribution device 4 either hosts application software or is a hard wired state machine which when executed receives the timecode from the device 6. In software form of the preferred embodiment, this is compatible with any desired operating system.

The host application software configures device 6, upon receipt of and triggering by the timecode causes a version of the film viewable on either the projector/large visual display screen via an HDMI cable. The host application software sends a message as a byte packet (Protobuf™ in the preferred embodiment) via an ethernet cable to a Wi-Fi switch 11. The Wi-Fi switch 11 is configured to receive and distribute Wi-Fi messages via ethernet cables to connected hardware including one or more Wi-Fi access points 5.

It will be appreciated that the Wi-Fi access points send and receive messages via Wi-Fi to wirelessly connected devices and then back to the distribution device 4 via the Wi-Fi switch 11. Here, an ethernet cable is used to connect the Wi-Fi switch 11 and a Wi-Fi key 12. The Wi-Fi key 12 enables secure Wi-Fi networks for the system 3. Of course, all devices need to be connected to the same Wi-Fi Network in order to send and receive messaging. Any preferred software/hardware can be used including Unifi/Ubiquiti™ software/hardware for the Wi-Fi network setup, however other Wi-Fi network manufacturers can also be used.

The VR headsets are also termed head mounted displays (HMDs) and are wirelessly connected in system 3. Here, an ethernet cable connection receives messaging from the application software associated with device 6 via the Wi-Fi switch 11. The Wi-Fi access point sends byte packets to devices connected to the Wi-Fi network triggering the film to play and the Wi-Fi network sends the byte packets from device 6 to devices connected to the network. The VR headsets (HMDs) and any other wirelessly connected devices are configured to store or hold a copy of the film on the device itself along with a wireless device application (WDA) (for example, .apy format).

The WDA receives the byte packets (Protobuf™) over the Wi-Fi network and then decodes the byte packets into a text string and split apart to trigger a response from the wireless device. Responses include triggering the film to play, stop, restart, rewind etc. The WDA also sends feedback to the desktop application on device 4 such as device connectivity and live battery life readings. This feedback is in the same format as the messaging being sent to the wireless devices (i.e. byte packets). Messaging sent from the wireless devices is the sent over the Wi-Fi network back to the distribution device 4 via the Wi-Fi access points 5 and Wi-Fi switch 11.

It will be appreciated that while the preferred embodiment have been designed to be compatible Pico™ G2 4K HMDs any preferred VR headsets can used by providing a corresponding application (ie .apks). Further, the number of VR headsets/HMDs that can be simultaneously connected is only limited to the number of Wi-Fi access points 5 connected. In the preferred embodiment of FIG. 2, this is 500 headsets per access point 5.

In the operation of the preferred embodiment, it will be appreciated that the system 3 is configured to deliver information in a hitherto unknown and advantageous manner to remove user observable latency and provide high stability. All byte packets are sent via the ethernet cables to the Wi-Fi network using a TCP hand-shake agreement when the byte packets are received by the receiving device. In practice, this means that the distribution device 4 and VR headsets know what to expect from incoming data simultaneously. It is noted the Wi-Fi system also provides a significantly higher throughput of data when compared to a Bluetooth communication system, for example.

Furthermore, it will be understood the application software configuring distribution device 4 has been found to be superior in comparison to commercially available systems. This is achieved by the system configuration which allows transmission smaller packets of information and therefore utilises far less bandwidth significantly addressing latency and stability issues. The WDA (.apk) on the VR headsets of the preferred embodiment is also more intuitive and does not require communication with the distribution device 4 as often, removing further bandwidth capacity issues.

In other preferred embodiments of the invention, not illustrated, sound rack device 6 can be configured for use in any preferred environment. For example, in the case of movie cinemas, these typically provide a visual projector and corresponding audio system equipment operating in accordance with the industry developed Digital Cinema Package (DCP) standards. These define the formatting of the information used with video, audio and sub-title files. In such preferred embodiments, the time code signals of the system 3 are sent from the DCP to the sound rack 6 to provide 7.1 or more channel audio and the DCP controls the video display/projector 8. In this way, existing infrastructure can be used in the implementation of the system 3 and method of operation thereof.

The foregoing describes only one embodiment of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A system for synchronising a plurality of virtual reality headsets to corresponding multichannel audio, the system comprising:
    a plurality of independently operable virtual reality headsets each having one or more images preloaded thereon;
    a distribution device in Wi-Fi communication via a wireless access point with each virtual reality headset, the distribution device configured to trigger the one or more preloaded images on each headset;
    a sound rack device in Wi-Fi communication with the distribution device and configured to send time codes signals there to;

a sound mixer in cable communication with the sound rack device and configured to receive audio file data corresponding to virtual reality image content therefrom simultaneously with the distribution device;

the distribution device being cable connected to the wireless access point and configured to simultaneously message each headset; and at least one speaker element for each channel of audio, each speaker element being connected to the mixer wherein upon receipt of the audio file, the mixer is configured to relay each channel audio signal to respective speakers in synchronisation with the VR headset images.

2. A system according to claim 1 including at least 7.1 audio channels.

3. A system according to claim 1 wherein all virtual reality headsets and speaker elements are disposed in a single enclosed room.

4. A system according to claim 1 including a two-dimensional display cable connected to the distribution device and configured to simultaneously display content corresponding to the one or more images displayed on each headset.

5. A system according to claim 1 wherein each headset is configured to broadcast via Wi-Fi communication data including headset battery life and performance characteristics to the distribution device.

6. A system according to claim 1 wherein the audio file includes 7.1 channels where each channel corresponds to a speaker element.

7. A system according to claim 1 wherein the system includes greater than 100 or greater than 200 virtual reality headsets.

8. A system according to claim 1 wherein the distribution device is a computer server.

* * * * *